(12) United States Patent
Bregman

(10) Patent No.: US 11,573,780 B2
(45) Date of Patent: Feb. 7, 2023

(54) AUTOMATED GENERATION OF STATUS CHAINS FOR SOFTWARE UPDATES

(71) Applicant: Red Hat, Inc., Raleigh, NC (US)

(72) Inventor: Arie Bregman, Gan Yavne (IL)

(73) Assignee: RED HAT, INC., Raleigh, NC (US)

(*) Notice: Subject to any disclaimer, the term of this patent is extended or adjusted under 35 U.S.C. 154(b) by 126 days.

(21) Appl. No.: 16/542,706

(22) Filed: Aug. 16, 2019

(65) Prior Publication Data

US 2021/0048999 A1 Feb. 18, 2021

(51) Int. Cl.
*G06F 8/65* (2018.01)
*G06F 8/71* (2018.01)

(52) U.S. Cl.
CPC . *G06F 8/65* (2013.01); *G06F 8/71* (2013.01)

(58) Field of Classification Search
CPC .................................... G06F 8/65; G06F 8/71
USPC ......................................................... 717/121
See application file for complete search history.

(56) References Cited

U.S. PATENT DOCUMENTS

| | | | | |
|---|---|---|---|---|
| 8,732,693 B2* | 5/2014 | Mutisya | ............... | G06F 11/3688 717/176 |
| 10,061,688 B2* | 8/2018 | Bartlow | ............... | G06F 8/71 |
| 10,175,978 B2* | 1/2019 | Biddle | ............... | G06F 11/3668 |
| 10,216,509 B2* | 2/2019 | Martin Vicente | ......... | G06F 8/61 |
| 10,303,586 B1* | 5/2019 | Falko | ............... | G06F 11/368 |
| 10,515,005 B1* | 12/2019 | Burrell | ............... | G06F 11/368 |
| 2013/0036328 A1* | 2/2013 | Mutisya | ............... | G06F 11/1433 714/15 |
| 2015/0052501 A1* | 2/2015 | Shani | ............... | G06F 11/3688 717/124 |
| 2015/0286558 A1* | 10/2015 | Bartlow | ............... | G06F 8/71 717/131 |
| 2017/0115976 A1* | 4/2017 | Mills | ............... | G06F 8/71 |
| 2017/0269921 A1* | 9/2017 | Martin Vicente | ......... | G06F 8/61 |
| 2018/0129497 A1* | 5/2018 | Biddle | ............... | G06F 8/71 |

OTHER PUBLICATIONS

Smith, S., "Practical Continuous Deployment: A Guide to Automated Software Delivery," Atlassian, Feb. 17, 2017, https://www.atlassian.com/blog/continuous-delivery/practical-continuous-deployment.
Jenkins, "Pipeline as Code," Downloaded from Internet Jun. 20, 2019, https://jenkins.io/doc/book/pipeline-as-code/.

* cited by examiner

*Primary Examiner* — Lewis A Bullock, Jr.
*Assistant Examiner* — Theodore E Hebert
(74) *Attorney, Agent, or Firm* — Kilpatrick Townsend & Stockton LLP

(57) ABSTRACT

Some examples can accurately determine a status of a software update across a number of development system components. In some examples, a method may involve receiving a software update comprising a set of computer-executable instructions and a reference to a location at which a status chain is to be stored. The method may also involve, in response to receiving the software update, performing at least one software development action with respect to the software update by executing a software development component among a plurality of software development components. The method may further involve determining a status of the software update based on performance of the at least one software development action. And the method may involve automatically causing a block to be added to the status chain at least in part by interfacing with the location, the block indicating the status of the software update and the software development component.

15 Claims, 6 Drawing Sheets

AUTOMATED GENERATION OF STATUS CHAINS FOR SOFTWARE UPDATES

TECHNICAL FIELD

The present disclosure relates generally to increasing the accuracy of status determinations for a software update while freeing up resources typically needed to make that status determination. More specifically, but not by way of limitation, this disclosure relates to a system capable of automated generation, and use, of software update status chains.

BACKGROUND

For any piece of software, multiple software updates may be required over its development and throughout its life. A production chain, in a software development context, describes the path that a software update traverses throughout the development cycle. In other words, a production chain represents the steps that a software update has taken from the moment that it was submitted by a developer to the time that it is packaged and delivered to a downstream user.

In some cases, one or more systems involved in the development of a software application/update (internal to or external to the development cycle) may need to determine a status for a particular software update in order to perform its functions. Such a status may reflect which development system components have processed that software update as well as what the status of that processing is.

DETAILED DESCRIPTION

Figure 1:
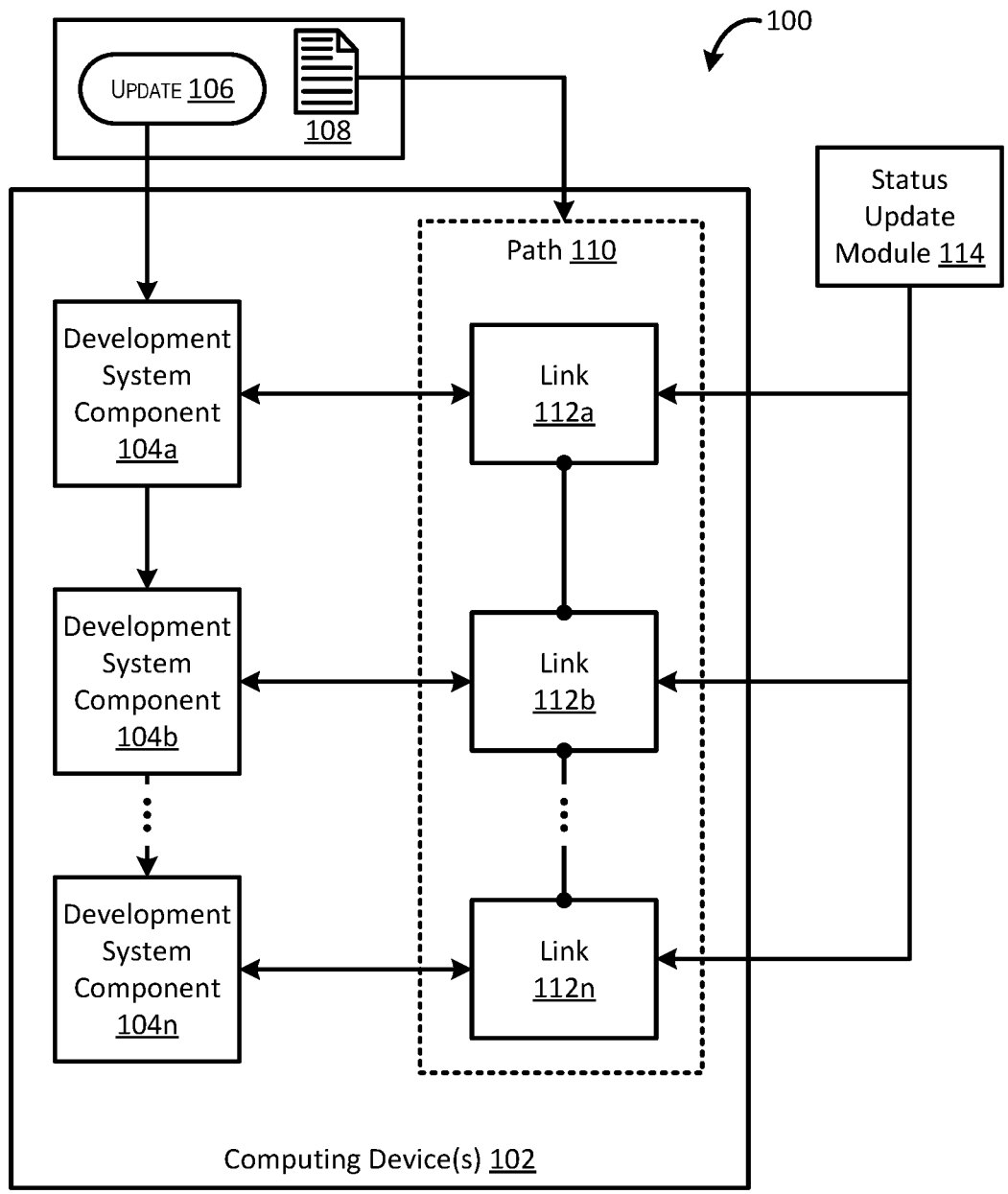
FIG. 1 is a block diagram of an example of a system for generating a software update status chain for a software update according to some aspects.

Most software applications require a number of software updates to be provided throughout their life (i.e., development and maintenance) in order to add/change the functionality of the software application, fix errors in the software application, update resources available to the software application, etc. A software update may be a set of computer-executable instructions, which may comprise a portion of code associated with an existing software application. The portion of code may be intended to replace an existing portion of code for the software application or to augment that code, for example, to provide improved functionality and/or fix a bug. In many cases, multiple software updates may be pushed through the development process at any given time. This is especially true for large and/or complex software applications. For example, a large number of "bugs" may be reported by end users of a software application. In order to address these bugs, each bug may be assigned to a different developer, who may create a software update that addresses that specific bug. In this example, the lead developer may be required to track the status of hundreds of separate software updates throughout the software development cycle. As one would imagine, this may lead to a number of software updates being missing from a patch which is rolled out to the software application, resulting in bugs not being fixed.

In many cases, lead developers may ask the developer assigned to each software update for the status of that update. However, this can be problematic for a number of reasons. In some cases, the software developer may not actually be aware of a current status of the software update. For example, the developer may believe that a software update is now in testing, but the software update may not have been properly checked in by the developer and may not have been merged to the testing environment. In other cases, the software developer may not be available to provide the information. Even if the developer is available and is able to provide the current status, doing so is very time consuming. The developer may need to provide status updates on a number of different software updates and may need to spend significant time and resources researching current statuses.

Some examples of the present disclosure can overcome one or more of the above-mentioned problems via a system that automatically generates software update status chains in order to enable automated reporting of software update statuses. More specifically, the system uses techniques which enable it to generate a software update status chain in an automated manner. A status chain is built as a sequence of blocks, where each block in the sequence of block includes the status of the software update with respect to a particular development system component. In the status chain, each bock is added in an order that the software update is received by a corresponding development system component.

In some examples, each software update may be accompanied by a configuration file that includes a path having one or more links. A link represents a step that the software update will take through the software development process, and may include at least a location reference. A location reference may be a reference to any location at which a resource (e.g., a status chain or driver) may be located. In some cases, a location reference may reference a location in the memory of a remote device (e.g., a remote server). For example, a location reference may be a uniform resource locator (URL) that references a memory location of a server that can be accessed via a network connection. In one example of such a system, the configuration file may list a number of components configured to receive the software update and a separate location reference associated with each of those components. In this example, the system may store, at each respective location, a driver configured to interact with the respective component. A driver may be any software component (e.g., application) configured to interact with a particular development system component. For example, a driver may be a software application configured to interact with a component using application programming interface calls associated with the software application. When a user wishes to determine a status of the software update, the locations referenced in the configuration file may be accessed and the drivers may be instantiated. Each driver in this example may be configured to interact with a respective component in order to query a status of the software update with that particular component.

By way of illustrating this first example, the system may receive a configuration file associated with a software update that includes a number of development system components and corresponding location references. In response to receiving a request for a status of the software update, the system may access and initiate drivers located at each of the referenced locations, which in turn may each interact with their respective component (e.g., via an API) to determine whether the software update has been successfully processed by that component. To do this, the driver may determine whether the software update is included in a library maintained by the component. The driver may then report the status of the software update to the system, which may in turn generate a block in a status chain indicating the status in association with the component as related via the configuration file.

In a second example of the system disclosed herein, the configuration file may list a single location reference at which is maintained a status chain for the software update. In this example, the configuration file may be provided to each component that receives the software update. Upon processing the software update, each component may access the status chain at the referenced location of the configuration file and add a block to that status chain indicating the status of the software update with component. This status chain could then be accessed at any time to determine a current status of the software update.

By way of illustrating this second example, a software update may be provided to the system by a software developer along with a configuration file that indicates a location reference. In this example, the software update may first be provided to a code repository. Upon being checked into the code repository, the system operating the repository may automatically generate a first block to be incorporated into a chain of blocks maintained at the location referenced in the configuration file. The software update may then be migrated to a first testing environment. After passing testing, the system which operates the first testing environment may then automatically generate a second block to be added to the first block. The software update may then be migrated to a second testing environment, which may automatically generate another block after testing is completed. This may be continued as the software update traverses to each component (e.g., repository, environment, etc.) until the software update is packaged and provided to a downstream user, to automatically generate a complete status chain.

It should be noted that the first example of the system described above may be more useful in a situation in which the developer is able to specify which components are to receive the software update (e.g., how the software update is to propagate through the components) or where components are not able to be adapted to automatically create a block on a status chain. The second example of the system described above may be more useful in a situation in which the developer does not know which components will ultimately receive the software update (e.g., what testing environments, etc.).

These illustrative examples are given to introduce the reader to the general subject matter discussed here and are not intended to limit the scope of the disclosed concepts. The following sections describe various additional features and examples with reference to the drawings in which like numerals indicate like elements but, like the illustrative examples, should not be used to limit the present disclosure.

FIG. 1 is a block diagram of an example of a system for generating a software update status chain a software update according to some aspects. The system 100 includes one or more computing devices 102. Examples of a computing device 102 can include a desktop computer, laptop computer, server computer, or mobile phone, which may include a number of modules and/or software applications, which are each composed of computer-executable instructions. In an illustrative example, the computing device(s) 102 may include a number of development system components 104a-n configured to receive one or more software updates 106.

A software update 106 received by the system 100 may be accompanied by a configuration file 108. The configuration file 108 may include an indication of a path 110, which may include a number of links 112. As noted above, a link 112 is a step in the path 110 that the software update 106 will take through the software development process. Each link 112 may include at least a reference location. In some cases, the configuration file 108 may include an indication of particular development system components 104 as well as links 112 that correspond to each of those development system components 104. In these cases, drivers may be stored at a memory location indicated in the links 112 that are configured to interact with the respective development system component 104 to generate a respective status block. Each of these status blocks may then be aggregated into a status chain. In other cases, the configuration file 108 may include a path 110 that includes a single link 112 or location reference, at which is stored a status chain for the software update 106. In these cases, the location referenced may be accessed by a development system component 104, which may generate and add a status block to the status chain.

As depicted, the computing devices 102 may include a number of development system components 104, which may be any system component (hardware or software) configured to perform a software development action in relation to one or more software updates during a software development cycle. For example, a typical software development process may involve development system components 104 comprising one or more code repositories, testing environments, code review systems, packaging systems, etc. Additionally, there may be multiple versions of each of the development system components, which may result in several "branches" of a software update status chain.

One illustrative example involving the computing device 102 of FIG. 1 can involve a scenario in which an software update 106 is received by the computing devices 102 along with a corresponding configuration file 108. In this exemplary scenario, the configuration file 108 may have multiple references to locations or a single reference to a location. The illustrative example may begin when the software update 106 is received at one of the development system components 104a. In some cases, each development system component 104a-n may be configured to automatically provide the software update 106 to a different development system component 104a-n once it has finished processing the software update 106. In some cases, the software update 106 may be manually moved from development system component 104a to development system component 104b. For example, upon completion of testing in a testing environment, all of the code implemented in the testing environment (including the software update 106) may be migrated to a production environment or another testing environment.

In some implementations of the illustrative example, each of the development system components 104a-n may be configured to perform some software development action on that software update 106 in response to receiving the software update 106. For example, upon receiving the software update 106 at a development system component 104a comprising a testing environment, the development system components 104a may merge the software update with the other code to be tested. The development system component 104a may be also be configured to parse the configuration file 108 in order to identify a location reference, access a status chain located at that location reference, generate a block indicating the status of the software update (e.g., with respect to the software development action performed), and/or add the generated block to the status chain. Thus, in this example the system 100 can be used to dynamically generate a status chain in real time.

In other implementations of the illustrative example, the development system components 104a-n may not be configured to automatically interact with the configuration file 108. Instead, the computing devices 102 may access the configuration file 108 in response to receiving a request for a status report with respect to the software update 106. The computing devices 102 may be further configured to initiate a number of drivers, each of which may be configured to interact with one or more corresponding development system components 104a-n. For example, the drivers may each be specific to a particular development system component and configured to interact with that particular development system component, so as to determine a status of the software update 106 at the particular development system component 104. Thus, in this example the system 100 can automatically (e.g., without user interaction) generate a status chain for a software update that reflects a current status as of the time that the status report is requested.

After generating the status chain, in some examples the generated status chain may then be provided to a status update module 114. The status update module can provide the statuses in each block to a user, providing an accurate status of the software update with respect to the development process. For example, the status update module can present a graphical user interface that visually depicts the status chain along with an indicator of where the software update 106 currently is in the status chain. To do this, the status update module 114 may be configured to either access the status chain stored at a reference location (e.g., within a link) or access each individual link and initiate a driver located at a reference location in that link.

In some examples, the configuration file 108 may specify one or more development system components 104a-n that are mandatory and/or one or more development system components 104a-n that are optional. For example, the configuration file 108 may include a list of components, each of the listed components being a required component through which the software update 106 must pass during the development process. In another example, a configuration file may include a flag for each component which indicates whether or not the component is a required component or an optional component. In these examples, a status update module which provides a status report for the software update may determine whether the software update has obtained a particular status with each required component.

For clarity, a certain number of components are shown in FIG. 1. But other examples may include more than one of each component. In addition, some examples may include more, fewer, or different components than are shown in FIG. 1. In addition, the components in FIG. 1 may communicate with one another via any suitable communication medium (including the Internet), using any suitable communication protocol.

Figure 2:
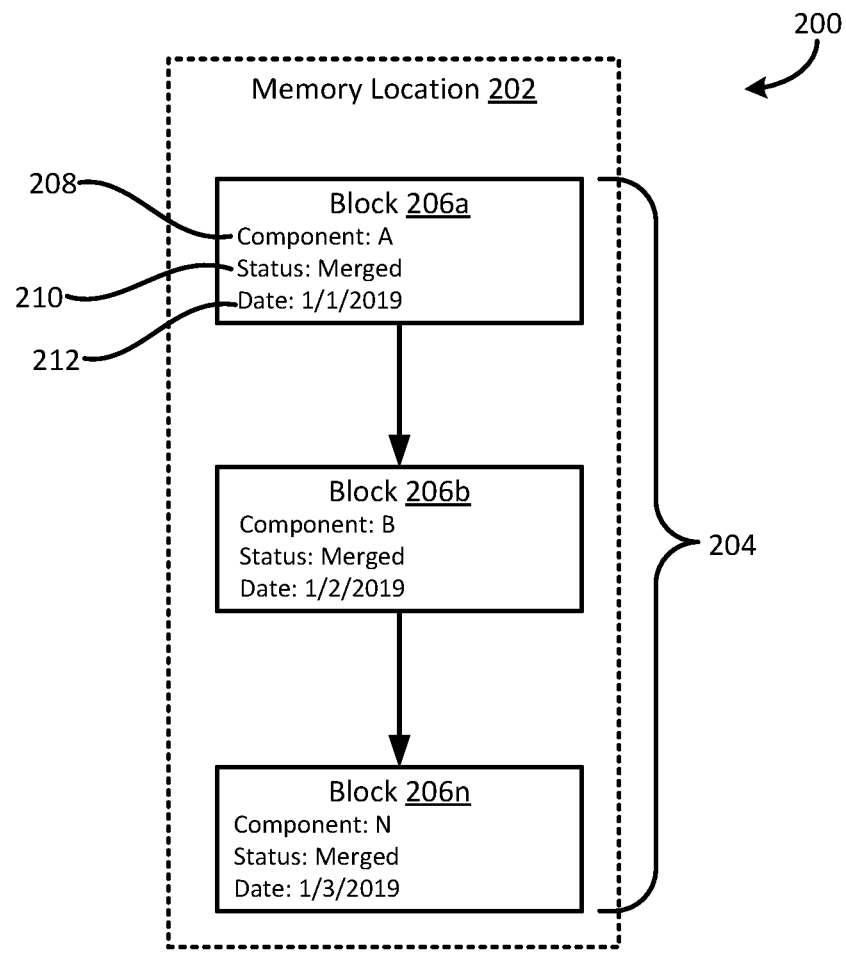
FIG. 2 depicts an example of a status chain that may be stored at a memory location with respect to a software update in accordance with the disclosure.

FIG. 2 depicts an example of a status chain that may be stored at a memory location with respect to a software update according to some aspects of the present disclosure. As described elsewhere, a configuration file (such as configuration file 108 described with respect to FIG. 1) may include a reference to one or more memory locations 202.

As described above, a configuration file may include one or more references to memory locations 202 at which a status chain 204 may be stored. A status chain 204 may be a sequence of blocks 206, each of which indicates the status of the software update associated with the configuration file at a particular development system component. Each block in the sequence is generated and added in the order that the software update is processed by its respective development system component. In the case that a status chain is stored at a memory location 202, each of a number of development system components may be configured to access the memory location (e.g., based on information in the configuration file) and generate blocks 206a-n that can be added to the status chain. For example, block 206a may be generated and added to the status chain 204 by development system Component A after Component A has processed the software update. The software update may then be provided to Component B, which may subsequently generate and add block 206b to the status chain 204 once Component B has processed the software update. The software update may then be provided to Component N, which may subsequently generate and add block 206n to the status chain 204 once Component N has processed the software update. This may be continued, for example, until the software update is packaged and shipped to the downstream users.

In some cases, a single development system component may generate multiple blocks 206. For example, a development system component may, upon receiving a software update, fail to perform its required action with respect to that software update. In this scenario, the development system component may generate a first block that indicates a failure status. The development system component may then again attempt to perform its required action on the software update and succeed this time, in which case the development system component may generate a second block on the status chain 204.

Each of the blocks 206a-n may include a number of details related to the software update and/or the development system component corresponding to the block. For example, the block 206a may include a component indicator 208 which identifies the development system component to which the block is related. In another example, the block 206a may include a status indicator which identifies a status of the software update with respect to the development system component to which the block is related. In some cases, the block 206a may also include a date/time indicator 212 which indicates a date and/or time at which the status of the software update was last updated. In some examples in which a status chain 204 is stored at a memory location 202 referenced by a configuration file, a status update module may be configured to, at any time, retrieve the status chain 204 from the memory location 202 and parse the blocks 206 to determine a current status of the software update.

Figure 3:
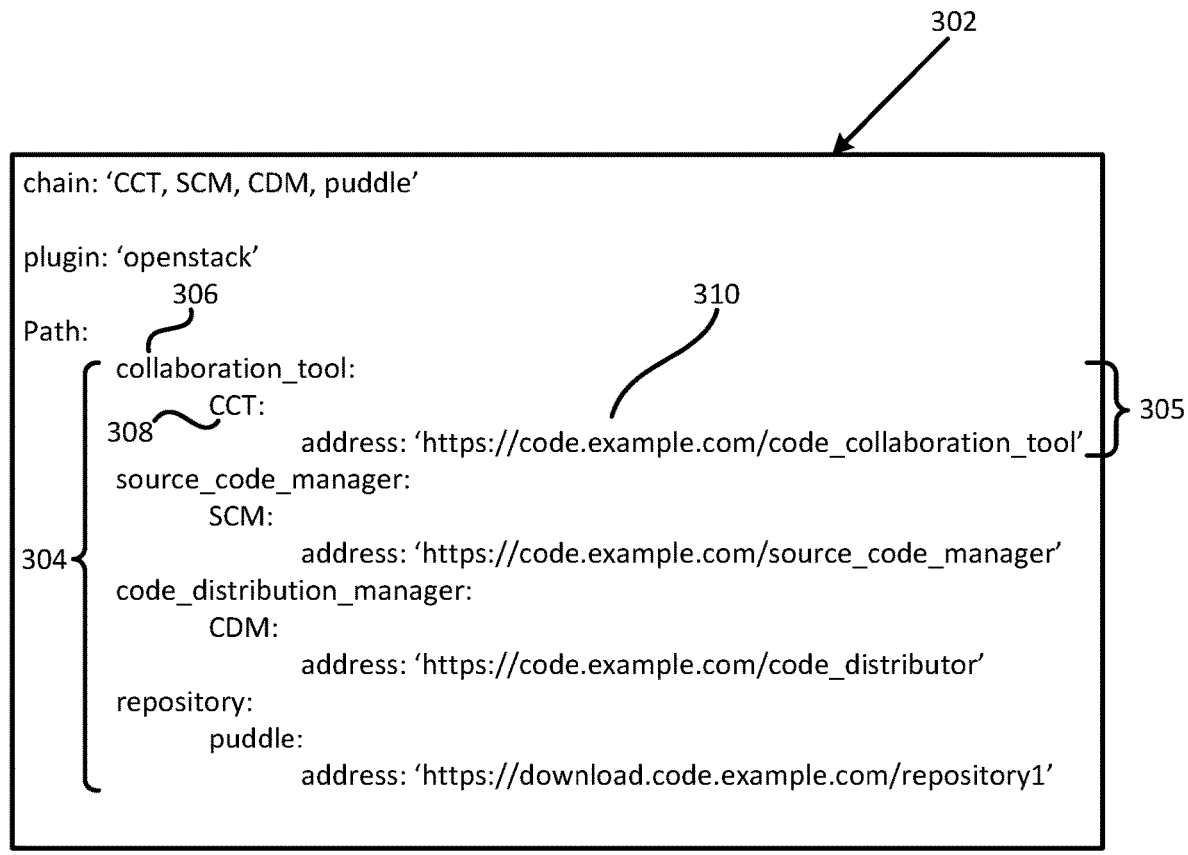
FIG. 3 depicts an example of a configuration file that may be associated with a software update in accordance with the disclosure.

FIG. 3 depicts an example of a configuration file 302 that may be associated with a software update according to some aspects of the present disclosure. In this example, each development system component is associated with a location reference. One or more drivers may be stored at each of the locations referenced. It should be noted that this configuration file 302 is presented as an alternative to a configuration file which references a location at which the status chain is stored, as described in other examples above.

In the configuration file 302, a user may specify a path 304 to be associated with the software update. The path 304 may indicate a number of specific development system components that a status update module should report upon. The path 304 may include a number of links 305 which are each associated with a specific development system component. Each link 305 may include a number of data fields. For example, a link 305 may include a component identifier 306, a nickname identifier 308, a location reference 310, or any other suitable data. In some examples, the link 305 may include a required flag which indicates whether the development system component associated with the link 305 is a required component. In some examples, the link 305 may include a required status data field which indicates a particular status that the software update must obtain with respect to the development system component associated with the link 305.

The configuration file 302 may be used by a status update module to dynamically generate a status chain status update module in some examples. For instance, the configuration file 302 may be available to the status update module, which may access each location referenced in the configuration file 302 for each development system component indicated in the path 304. The status update module may then add a block to the status chain indicating a status of the software update with respect to each development system component in the path 304. A more detailed description of an example of this process is provided below with respect to FIG. 4.

Figure 4:
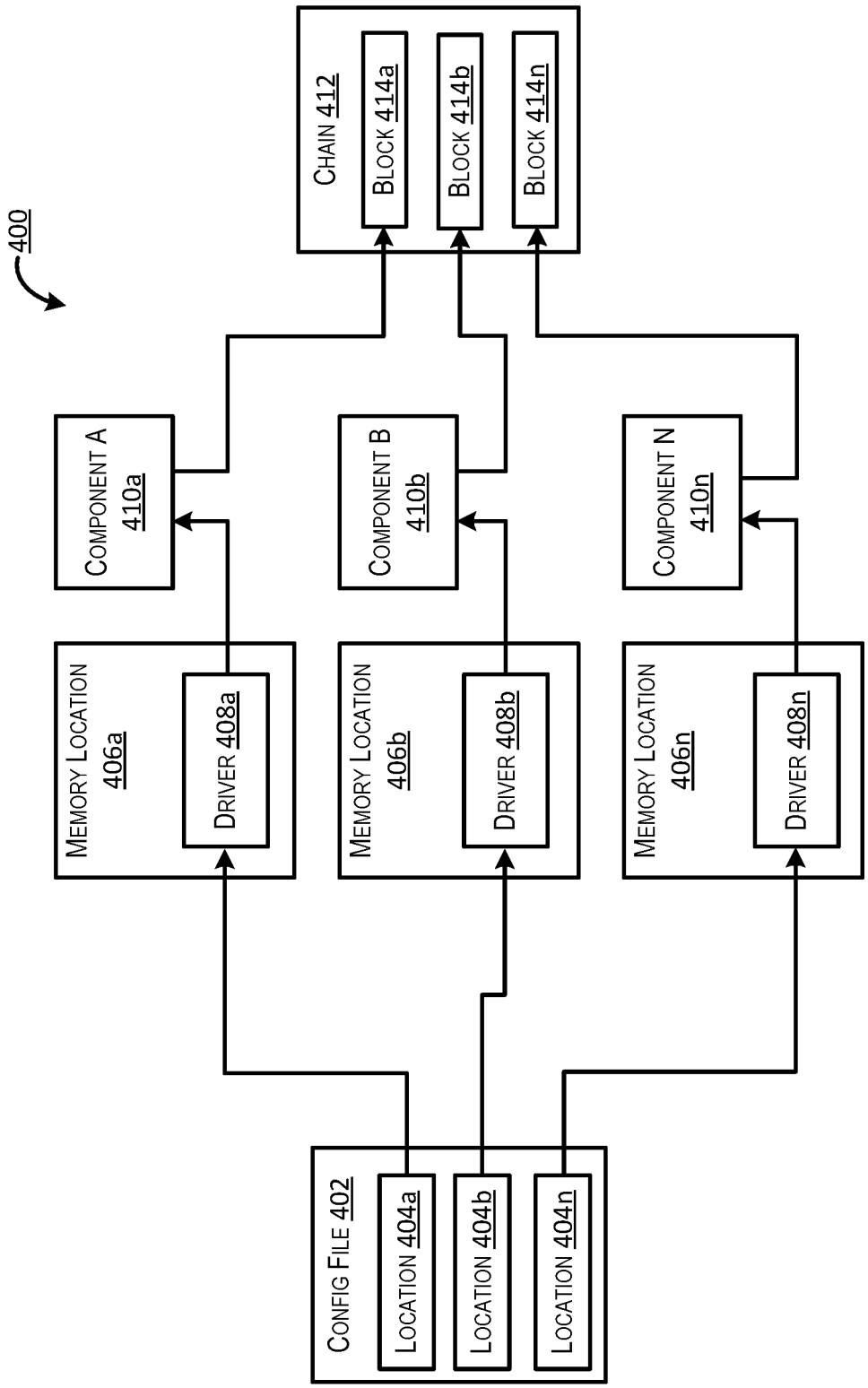
FIG. 4 depicts block diagram with an example of a process for generating a status chain using drivers in accordance with the disclosure.

FIG. 4 depicts block diagram of an example of a process for generating a status chain using drivers in accordance with the disclosure. In this example, a status update module may access a configuration file 402, which may be a configuration file similar to configuration file 302 described with respect to FIG. 3 above. The status update module may then access each of a number of location references 404a-n. At least one of these location references 404a-n may correspond to the location reference 310 described with respect to FIG. 3 above. The status update module may then access memory locations 406a-n associated with each of the location references 404a-n to access drivers 408a-n stored at the respective memory locations 406a-n. Each of the drivers 408a-n may be configured to interact with a particular one of the development system components 410a-n to determine a status of the software update with respect to that development system component. In some cases, one or more of the drivers 408a-n may need to be created specifically for a development system component. For example, a driver 408a may be created as a set of computer executable instructions that uses API calls specific to a development system component 410a. In some cases, a driver may receive as input an identifier of a software update and may be configured to determine a status of the software update with respect to the particular development system component to which the driver relates. One skilled in the art would recognize that the driver, and the memory location, could be referenced by configuration files for any number of different software updates.

The drivers 408a-n, upon being initiated, may each be configured to determine a status of the software update, access a status chain 412, and generate and add a block 414a-n to the status chain 412. In this example, each respective driver 408a-n at each respective memory location 406a-n may be accessed in a sequence corresponding to the order in which the location references 404 are presented in the configuration file 402. It should be noted that a block may be a string of text characters and the status chain 412 may be a document.

By way of illustration, a status update module in the example system of FIG. 4 may receive a request for a status report for a particular software update. In this scenario, the status update module may locate a configuration file 402 associated with that software update. The status update module may then parse the configuration file 402 to identify a number of location references 404a-n. Once identified, the status update module may initiate drivers 408a-n at each of the memory locations 406a-n in sequence. For example, the status update module may access memory location 406a indicated by location reference 404a in the configuration file 402. At memory location 406a the status update module may initiate the driver 408a. Driver 408a, once initiated, may cause the computing device on which it is initiated to interact with Component A 410a. In some cases, this may involve checking a library associated with Component A to see if the software update has been included in that library. In some cases, this may involve checking with Component A for a testing status of the software update. Once a status is determined, the driver 408a may be further configured to generate block 414a that indicates a status of the software update with respect to Component A and add that block 414a to the status chain 412.

Once block 414a has been generated and added to the status chain 412, the status update module may repeat the process by accessing and initiating the driver 408b located at memory location 406b. This may be repeated for each of the location references 404 included in the configuration file 402. It should be noted that while the example system described in FIG. 4 is able to dynamically generate a status chain upon request, a developer of the software update may need to provide user input to the system indicating which development system components will be involved in the development cycle for the software update to enable the status update module to develop an accurate status chain.

Figure 5:
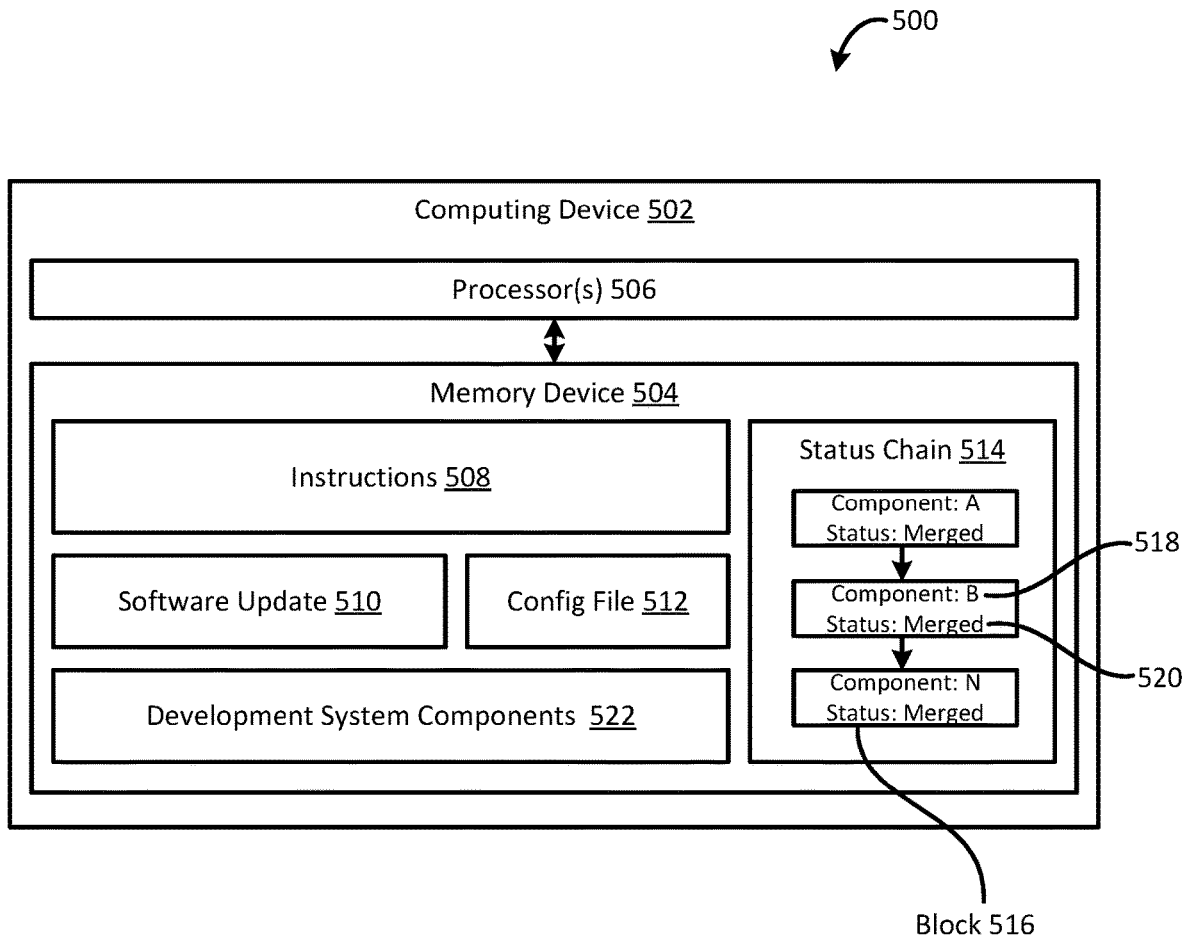
FIG. 5 is a block diagram of an example system for generating software update status chain data according to some aspects.

FIG. 5 is a block diagram of an example system 500 for generating software-update status-chain data according to some aspects. The system 500 includes one or more computing devices, collectively referred to as computing device 502, communicatively coupled with one or more memory devices, collectively referred to as memory device 504. The computing device 502 can include one processor or multiple processors. Non-limiting examples of the processor 506 include a Field-Programmable Gate Array (FPGA), an application-specific integrated circuit (ASIC), a microprocessor, etc. The processor 506 can execute instructions 508 stored in the memory device 504 to perform operations. In some examples, the instructions 508 can include processor-specific instructions generated by a compiler or an interpreter from code written in any suitable computer-programming language, such as C, C++, C#, etc. In a first example, the computing device 502 may be a computer which hosts a development system component as described elsewhere. In a second example, the computing device 502 may be a computer which hosts a status update module as described elsewhere.

The memory device 504 can include one memory device or multiple memory devices. The memory device 504 can be non-volatile and may include any type of memory device that retains stored information when powered off. Non-limiting examples of the memory device 504 include electrically erasable and programmable read-only memory (EEPROM), flash memory, or any other type of non-volatile memory. In some examples, at least some of the memory device 504 can include a medium from which the processor 506 can read instructions 508. A computer-readable medium can include electronic, optical, magnetic, or other storage devices capable of providing the processor 506 with computer-readable instructions or other program code. Non-limiting examples of a computer-readable medium include magnetic disk(s), memory chip(s), ROM, random-access memory (RAM), an ASIC, a configured processor, optical storage, or any other medium from which a computer processor can read the instructions 508.

In some examples, the computing device 502 may receive a software update 510 to be applied to a software application. Additionally, the computing device 502 may receive a configuration file 512 associated with the software update 510. A configuration file 512 may include a number of data fields associated with the software update and/or development system components as well as one or more location references. In some cases, the configuration file 512 may include a path indicating an order in which various development system components will process the software update. In some cases, the configuration file 512 may also include an indication of what development system components are required components. This may involve the use of a list of required components or a flag associated with each development system component.

The computing device 502 may store a status chain 514 associated with software update 510. The status chain 514 may include a number of blocks 516. Each block 516 may indicate at least a development system component 518 and a status 520 of the software update 510 with respect to that development system component 518. It should be noted that while the status chain 514 is depicted as being stored in the memory device 504 of computing device 502, the status chain 514 may instead be stored on a separate computing device.

In some cases, the memory device 504 of the computing device 502 may also include one or more development system components 522. Each of these development system components 522 may be configured to play some role in the software development process by performing some action with respect to software updates (i.e., a software development action). One skilled in the art would recognize that there are a wide variety of different development system components 522 that may be suitable. It should be noted that while the development system components 522 are depicted as being stored in the memory device 504 of computing device 502, the development system components 522 may instead be stored on, and executed from, one or more separate computing devices.

In some examples of the system disclosed herein, each block 514 is generated by a development system component of the one or more development system components 522 as it processes the software update. In these examples, the status chain 514 may, at any given time, reflect the current status of the software update.

In some examples in which each block 514 is generated by a development system component, each development system component 522 may be configured to perform at least one software development action with respect to the set of computer-executable instructions forming the software update. This may include storing the software update and/or adding the software update to a library, performing testing on the software update (e.g., white-box testing), or any other suitable action. The development system component may then be configured to determine a status of the software update based upon the performance of the at least one software development action. For example, the development system component may indicate whether the at least one software development action was successfully performed. The development system component may then be configured to automatically (e.g., without human interaction) access the status chain via the reference to the location provided in the configuration file 512 and automatically add a block to the status chain indicating at least the development system component and the status.

In other examples of the system disclosed herein, each block 514 is generated by a driver associated with each of the one or more development system components 522. In these examples, the status chain 514 may be dynamically generated when a status report is requested.

In examples in which each block 514 is dynamically generated by a driver associated with a respective development system component, the development system component need not be configured as described above. Instead, a number of drivers may be accessed at various memory locations by a status update module, and each driver may generate a block 514 for its respective development system component. This is described in greater detail with respect to FIG. 4 above.

Figure 6:
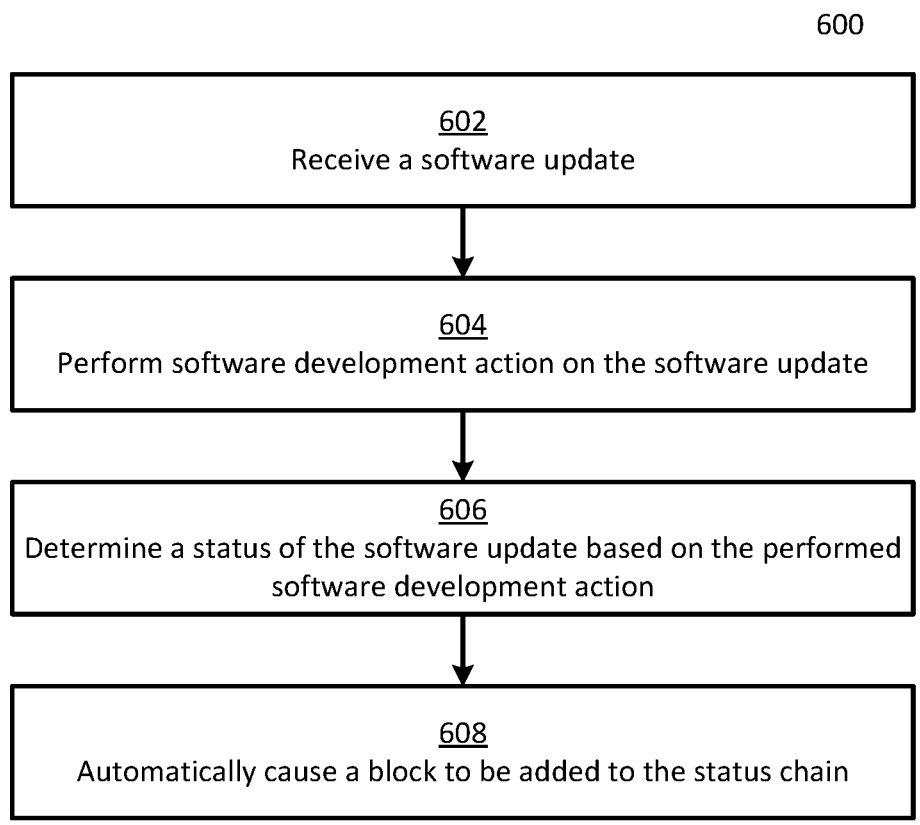
FIG. 6 is a flow chart of an example process for generating a software update status chain according to some aspects.

FIG. 6 is a flow chart of an example process for generating a software update status chain according to some aspects. The process 600 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the process 600 (or any other processes described herein, or variations and/or combinations thereof) may be performed under the control of one or more computer systems configured with executable instructions and may be implemented as code (e.g., executable instructions, one or more computer programs or one or more applications). The steps of FIG. 6 are discussed below with reference to the components discussed above in relation to FIG. 5.

The process 600 may begin at operation 602, when a software update 510 is received by the computing device 102. In some cases, the software update may be accompanied by a configuration file 512, which may include at least a reference to a location. In some cases, the configuration file may include a reference to multiple locations as well as corresponding development system components 516. In some cases, the configuration file 512 may include an indication of a single location reference. A reference to a location may be a uniform resource locator (URL), an Internet Protocol (IP) address, etc.

At operation 604, the process 600 may involve performing at least one software development action involving the software update. For example, the process may involve merging the software update with another version of the software in order to generate a test version. In another example, the software development action may be an action to check in or store the software in a data repository with the rest of the software code.

At operation 606, the process 600 may involve determining a status of the software update based on the at least one software development action. For example, in the scenario in which the software development action is to merge the software update with other software code, the status may indicate whether or not that merge was successful.

At operation 608, the process 600 may involve automatically causing a block to be added to a status chain associated with the software update. In some cases, this may involve accessing the status chain associated with the software update at the location referenced in the configuration file and retrieving the status chain stored there. In some cases, multiple status chains may be stored in a single location and the process may also involve identifying the status chain associated with the software update. This may further involve generating a block that includes an identifier for the development system component and a status of the software update with respect to that component as determined above. The generated block may then be appended to the end of the status chain. In some cases, the development system component may communicate the determined status to a computing device that manages the status chain and that computing device may generate a block to be added to the status chain.

In some cases, the process 600 may further involve receiving a request for status of the software update, accessing the status chain via the referenced location, and generating a status report which includes an aggregate of the development system component and the status from each block in the status chain. In some cases, this may further involve determining, based on the blocks included in the status chain, whether the software update has been processed by a number of required system components. For example, a number of required system components may be specified by a user (e.g., in the configuration file 512).

Some examples of this disclosure provide for a number of advantages over conventional systems. For instance, systems described herein can quickly and accurately generate a software update status report that is more accurate while requiring less resource consumption on the part of software developers. Additionally, the system can generate the report in an automated manner even in cases in which a developer is not fully apprised of the development process, which conventional systems cannot achieve. For example, the system can generate a status chain which reflects each of the development system components involved in the development process which have handled the software update, regardless of whether the software update was initially slated to be processed by those development system components. Since this is done automatically, there is no requirement that a developer of the software update keep track of that software update.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure. For instance, any example(s) or features described herein can be combined with any other example(s) or features to yield further examples. A recitation of "a", "an" or "the" is intended to mean "one or more" unless specifically indicated to the contrary.

The invention claimed is:

1. A computing device system comprising:
one or more processors; and
one or more memory devices comprising instructions that are executable by the one or more processors for causing the one or more processors to:
receive a software update;
receive a configuration file specifying:
a reference to a location at which a status chain is to be stored;
addresses to memory locations outside the configuration file of drivers configured to interact with a plurality of software development components configured to perform software development actions on the software update during a software development process;
a predefined order in which the plurality of software development components are to perform the software development actions; and
a flag for each software development component indicating whether the software development component is required or optional in the software development process, wherein at least one of the plurality of software development components is flagged as optional in the configuration file and another of the plurality of software development components is flagged as required in the configuration file, and wherein the configuration file designates a proper subset of the plurality of software development components as required software-development components;
in response to receiving the software update and the configuration file, perform the software development actions on the software update by executing at least the required software-development components in the predefined order;
for each of the software development actions, determine whether the software development action succeeded or failed by using a corresponding one of the drivers to interact with a corresponding one of the software development components to determine whether the software update was successfully processed by that software development component;
automatically cause a first block to be added to the status chain at least in part by interfacing with the location, the first block indicating a failure of a software development component to perform its corresponding software development action on the software update;
in response to determining that the software development component failed to perform its corresponding software development action on the software update, cause the software development component to re-execute its corresponding software development action on the software update; and
automatically cause a second block to be added to the status chain at least in part by interfacing with the location, the second block indicating that the software development component succeeded in performing its corresponding software development action on the software update.

2. The system of claim 1, wherein the status chain comprises a sequence of blocks, and wherein each block is generated by a respective software development component among the plurality of software development components.

3. The system of claim 2, wherein each block is generated in the sequence of blocks in an order in which the software update is received by each corresponding software-development component among the plurality of software development components.

4. The system of claim 1, wherein the location is remote from the one or more processors, and wherein the reference to the location comprises a uniform resource locator (URL) or an internet protocol (IP) address.

5. The system of claim 1, wherein the one or more memory devices further comprise instructions that are executable by the one or more processors for causing the one or more processors to:
  receive a status request for the software update;
  obtain the status chain from the location; and
  generate a status report based on the status from each block in the status chain.

6. The system of claim 1, wherein one or more blocks of the status chain further include a date corresponding to a status of the software update.

7. The system of claim 1, wherein the addresses are provided as URLs or IP addresses in the configuration file.

8. A method comprising:
  receiving, by one or more processors, a software update comprising a set of computer-executable instructions;
  receiving, by the one or more processors, a configuration file specifying:
    a reference to a location at which a status chain is to be stored;
    addresses to memory locations outside the configuration file of drivers configured to interact with a plurality of software development components configured to perform software development actions on the software update during a software development process;
    a predefined order in which the plurality of software development components are to perform the software development actions; and
    a flag for each software development component indicating whether the software development component is required or optional in the software development process, wherein at least one of the plurality of software development components is flagged as optional in the configuration file and another of the plurality of software development components is flagged as required in the configuration file, and wherein the configuration file designates a proper subset of the plurality of software development components as required software-development components;
  in response to receiving the software update and the configuration file, performing, by the one or more processors, the software development actions on the software update by executing at least the required software-development components in the predefined order;
  for each of the software development actions, determining, by the one or more processors, whether the software development action succeeded or failed by using a corresponding one of the drivers to interact with a corresponding one of the software development components to determine whether the software update was successfully processed by that software development component;
  automatically causing, by the one or more processors, a first block to be added to the status chain at least in part by interfacing with the location, the first block indicating a failure of a software development component to perform its corresponding software development action on the software update;
  in response to determining that the software development component failed to perform its corresponding software development action on the software update, causing, by the one or more processors, the software development component to re-execute its corresponding the software development action on the software update; and
  automatically causing, by the one or more processors, a second block to be added to the status chain at least in part by interfacing with the location, the second block indicating that the software development component succeeded in performing its corresponding software development action on the software update.

9. The method of claim 8, wherein the status chain comprises a sequence of blocks, and wherein each block is generated by a respective software development component among the plurality of software development components.

10. The method of claim 9, wherein each block is generated in the sequence of blocks in an order that the software update is received by each corresponding software-development component among the plurality of software development components.

11. The method of claim 8, wherein the location is remote from the one or more processors, and wherein the reference to the location comprises a uniform resource locator (URL) or an internet protocol (IP) address.

12. The method of claim 8, further comprising:
  receiving a request for status of the software update;
  obtaining the status chain from the location; and
  generating a status report based on the status from each block in the status chain.

13. The method of claim 8, further comprising:
  determining, based on blocks included in the status chain, whether the software update has been processed by the required software-development components to determine a status of the software update with respect to the required software-development components.

14. The method of claim 8, wherein the addresses are provided as URLs or IP addresses in the configuration file.

15. A non-transitory computer-readable medium comprising program code executable by one or more processing devices for causing the one or more processing devices to:
  receive a software update;
  receive a configuration file specifying:
    a reference to a location at which a status chain is to be stored;
    addresses to memory locations outside the configuration file of drivers configured to interact with a plurality of software development components configured to perform software development actions on the software update during a software development process;
    a predefined order in which the plurality of software development components are to perform the software development actions; and
    a flag for each software development component indicating whether the software development component is required or optional in the software development process, wherein at least one of the plurality of software development components is flagged as optional in the configuration file and another of the plurality of software development components is flagged as required in the configuration file, and wherein the configuration file designates a proper subset of the plurality of software development components as required software-development components;

in response to receiving the software update and the configuration file, perform the software development actions on the software update by executing at least the required software-development components in the predefined order;

for each of the software development actions, determine whether the software development action succeeded or failed by using a corresponding one of the drivers to interact with a corresponding one of the software development components to determine whether the software update was successfully processed by that software development component;

automatically cause a first block to be added to the status chain at the location at least in part by interfacing with the location, the first block indicating a failure of a software development component to perform its corresponding software development action on the software update;

in response to determining that the software development component failed to perform its corresponding software development action on the software update, cause the software development component to re-execute its corresponding software development action on the software update; and automatically cause a second block to be added to the status chain at least in part by interfacing with the location, the second block indicating that the software development component succeeded in performing its corresponding software development action on the software update.

\* \* \* \* \*